(12) United States Patent
Avdovic et al.

(10) Patent No.: US 12,605,765 B2
(45) Date of Patent: Apr. 21, 2026

(54) POWDER MATERIAL

(71) Applicant: Siemens Energy Global GmbH & Co. KG, Munich (DE)

(72) Inventors: Pajazit Avdovic, Norrkoping (SE); Jonas Eriksson, Finspong (SE); Jerry Fornander, Finspang (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 1057 days.

(21) Appl. No.: 17/636,868

(22) PCT Filed: Aug. 24, 2020

(86) PCT No.: PCT/EP2020/073620
§ 371 (c)(1),
(2) Date: Feb. 19, 2022

(87) PCT Pub. No.: WO2021/043611
PCT Pub. Date: Mar. 11, 2021

(65) Prior Publication Data
US 2022/0266335 A1 Aug. 25, 2022

(30) Foreign Application Priority Data
Sep. 3, 2019 (EP) .................................... 19195134

(51) Int. Cl.
B33Y 70/00 (2020.01)
B22F 1/052 (2022.01)
(Continued)

(52) U.S. Cl.
CPC .............. B22F 10/28 (2021.01); B22F 1/052 (2022.01); B28B 1/001 (2013.01); B33Y 10/00 (2014.12); B33Y 70/00 (2014.12); B22F 2304/10 (2013.01)

(58) Field of Classification Search
CPC .......... B22F 10/28; B22F 1/052; B22F 10/34; B22F 12/13; B22F 12/44; B22F 10/32;
(Continued)

(56) References Cited

U.S. PATENT DOCUMENTS 5,590,387 A 12/1996 Schmidt et al.
10,424,786 B1 * 9/2019 Mason .............. H01M 10/0525
(Continued)

FOREIGN PATENT DOCUMENTS

CN 104903029 A 9/2015
CN 107427915 A 12/2017
(Continued)

OTHER PUBLICATIONS

PCT International Search Report and Written Opinion of International Searching Authority mailed Oct. 23, 2020 corresponding to PCT International Application No. PCT/EP2020/073620 filed Aug. 24, 2020.

*Primary Examiner* — Chris Q Liu
(74) *Attorney, Agent, or Firm* — Wolter Van Dyke Davis, PLLC

(57) ABSTRACT

A powder material for additive manufacturing providing an improved microstructure and shape of a product including particles, wherein at most 25 wt.-% of the particles provide a particle size differing more than 20% from the $D_{50}$ based on the value of the $D_{50}$. A method of additive manufacturing includes the step of manufacturing a product from this powder material or repairing a product utilizing this powder material.

15 Claims, 3 Drawing Sheets

(51) Int. Cl.
  B22F 10/28      (2021.01)
  B28B 1/00      (2006.01)
  B33Y 10/00      (2015.01)

(58) Field of Classification Search
  CPC .......... B22F 12/53; B22F 1/065; B22F 1/148; B22F 10/60; B22F 10/64; B22F 10/73; B22F 12/49; B22F 2999/00; B22F 3/105; B22F 5/04; B22F 9/04; B22F 1/05; B22F 1/08; B22F 1/10; B22F 1/16; B22F 10/00; B22F 10/25; B22F 10/37; B22F 10/38; B22F 10/66; B22F 12/63; B22F 2009/041; B22F 3/15; B22F 3/225; B22F 3/24; B22F 9/002; B22F 9/082; B22F 1/054; B22F 1/09; B22F 1/107; B22F 1/12; B22F 10/14; B22F 10/36; B22F 10/362; B22F 10/68; B22F 12/30; B22F 12/41; B22F 12/50; B22F 2003/244; B22F 2003/247; B22F 2003/248; B22F 2009/001; B22F 2009/043; B22F 2201/11; B22F 2202/13; B22F 2301/052; B22F 2301/15; B22F 2301/20; B22F 2301/205; B22F 2301/25; B22F 2301/35; B22F 2302/45; B22F 2304/10; B22F 2304/15; B22F 2998/00; B22F 2998/10; B22F 3/04; B22F 3/1021; B22F 3/1025; B22F 3/16; B22F 5/009; B22F 7/08; B22F 9/026
  USPC ...................................................... 219/76.12
  See application file for complete search history.

(56) References Cited

U.S. PATENT DOCUMENTS

| | | | |
|---|---|---|---|
| 2012/0237745 A1 | 9/2012 | Dierkes et al. | |
| 2015/0321255 A1 | 11/2015 | Colin | |
| 2016/0175929 A1* | 6/2016 | Colin ...................... | B28B 1/001 |
| | | | 219/76.12 |
| 2017/0021425 A1 | 1/2017 | Fang et al. | |
| 2017/0346079 A1* | 11/2017 | Friend ................... | H01M 4/387 |
| 2018/0069234 A1* | 3/2018 | Friend ................... | H01M 4/622 |
| 2018/0104741 A1 | 4/2018 | Heinrichsdorf | |
| 2019/0008749 A1* | 1/2019 | Harris .................... | A61Q 17/04 |
| 2019/0051906 A1* | 2/2019 | Rhee ......................... | C01F 7/02 |
| 2019/0148718 A1* | 5/2019 | Hatazawa ............. | H01M 4/587 |
| | | | 429/231.8 |
| 2019/0255609 A1 | 8/2019 | Godfrey et al. | |
| 2020/0230695 A1 | 7/2020 | Protzmann | |

FOREIGN PATENT DOCUMENTS

| | | |
|---|---|---|
| CN | 110167698 A | 8/2019 |
| FR | 3008014 A1 | 1/2015 |

* cited by examiner

POWDER MATERIAL

CROSS REFERENCE TO RELATED APPLICATIONS

This application is the US National Stage of International Application No. PCT/EP2020/073620 filed 24 Aug. 2020, and claims the benefit thereof. The International Application claims the benefit of European Application No. EP19195134 filed 3 Sep. 2019. All of the applications are incorporated by reference herein in their entirety.

FIELD OF INVENTION

The present invention refers to a powder material for additive manufacturing providing an improved microstructure and shape of a product. Furthermore, the present invention refers to a method of additive manufacturing utilizing such powder material in the step of manufacturing a product or repairing a product. Additionally, the present invention refers to a use of such powder material for additive manufacturing. Furthermore, the present invention refers to a product manufactured or repaired utilizing such powder material or method.

BACKGROUND OF INVENTION

Additive manufacturing is a very flexible method of manufacturing, wherein a product is manufactured by adding material on an existing part or right from the scratch. In recent years the possibilities significantly improved and this new method of manufacturing products has been introduced into industrial applications. Especially, the possibility to build up structures utilizing geometries not possible using conventional methods of manufacturing significantly increases the benefit provided herewith. Methods like 3D printing, for example, utilize a metal or metal composition powder being melted layer by layer to manufacture a complex 3D structure. Despite the high flexibility provided with such method, certain requirements are still to be considered. Especially for applications demanding a high accuracy was noted that, for example, minor deviations occur despite optimized operating conditions. As the requirements for such manufacturing methods constantly increase, preventing such deviations provides a significant challenge to be solved. For example, preventing deviations of the shape of the product resulting in post processing steps. For example, preventing cavities enclosed in the product influencing the integrity and stability.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to one aspect the present invention refers to a powder material for additive manufacturing comprising, preferably consisting of, particles, at most 25 weight percent (wt.-%), preferred at most 22 wt.-%, more preferred at most 13 wt.-%, even more preferred at most 9 wt.-%, of the particles provide a particle size differing more than 20% from the $D_{50}$ based on the value of the $D_{50}$. In specific embodiments it is even preferred that the particle size of the aforementioned upper limit of the particles that are less than 17%, more preferred less than 15% from the $D_{50}$. The term "$D_X$" as used herein like $D_{10}$, $D_{50}$ or $D_{100}$ refers to the particle size at which X wt.-% of the particles provide at most this particle size determined utilizing volume average particle size distribution. For example, a $D_{50}$ of 30 μm characterizes that 50 wt.-% of the particles provide a particle size of 30 μm or less determined utilizing volume average particle size distribution. The determination of the $D_{50}$ is, for example, realized using laser granulometry utilizing a particle size measurement device of the company Quantachrome (device: Cilas 1064). The measurement is performed according to the manufacturer specifications. For this purpose, 1.5 g of the powder material is dispersed in 100 ml ethanol, treated for 300 seconds in an ultrasonic bath (device: Sonorex IK 52, company Bandelin) and then placed in the sample preparation cell of the measuring device using a Pasteur pipette and measured several times. The resulting average values are formed from the individual measurement results. The evaluation of the scattered light signals is carried out according to the Fraunhofer method.

Surprisingly it was noted, that corresponding powder materials provide the significantly improved reliability with regard to the structures manufactured utilizing additive manufacturing. It is assumed that such more homogeneous powder provides a more consistent powder structure when applied as powder bed or even when sprayed onto the surface to be treated resulting in an improved process. Typically, it should be expected that such minor deviations of the particle size should make little difference. Also, current processes achieve high-quality results with commonly available materials. It also seems that many other effects resulting in, for example, deviations from the predefined operating conditions are far greater than the effect of corresponding powder materials. Resulting deviations of the final product are currently corrected by some post processing steps if they are not acceptable to current products. However, newly developed and optimized processing methods significantly decrease such other effects resulting in such deviations originating from the powder material becoming dominant. Therefore, it was surprisingly noted that optimized manufacturing processes like in the 3D printing area, especially when utilizing a powder bed to be melted layerwise, are suffering from such former low-level problem becoming significant for future applications.

According to a further aspect the present invention refers to a method of additive manufacturing containing the step of manufacturing the product from an inventive powder material or repairing a product utilizing an inventive powder material. Especially, it was noted that 3D printing significantly benefits from utilizing such inventive powder material. For example, 3D printing processes utilizing a powder bed to manufacture structures layer-wise by melting layers of powder material provide a significantly more homogeneous and reliable process utilizing the inventive powder material.

According to a further aspect the present invention refers to a use of an inventive powder material for additive manufacturing, more preferred 3D-printing.

According to a further aspect the present invention refers to a product manufactured from an inventive powder material or according to an inventive method or repaired utilizing an inventive powder material or an inventive method.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

Figure 1:
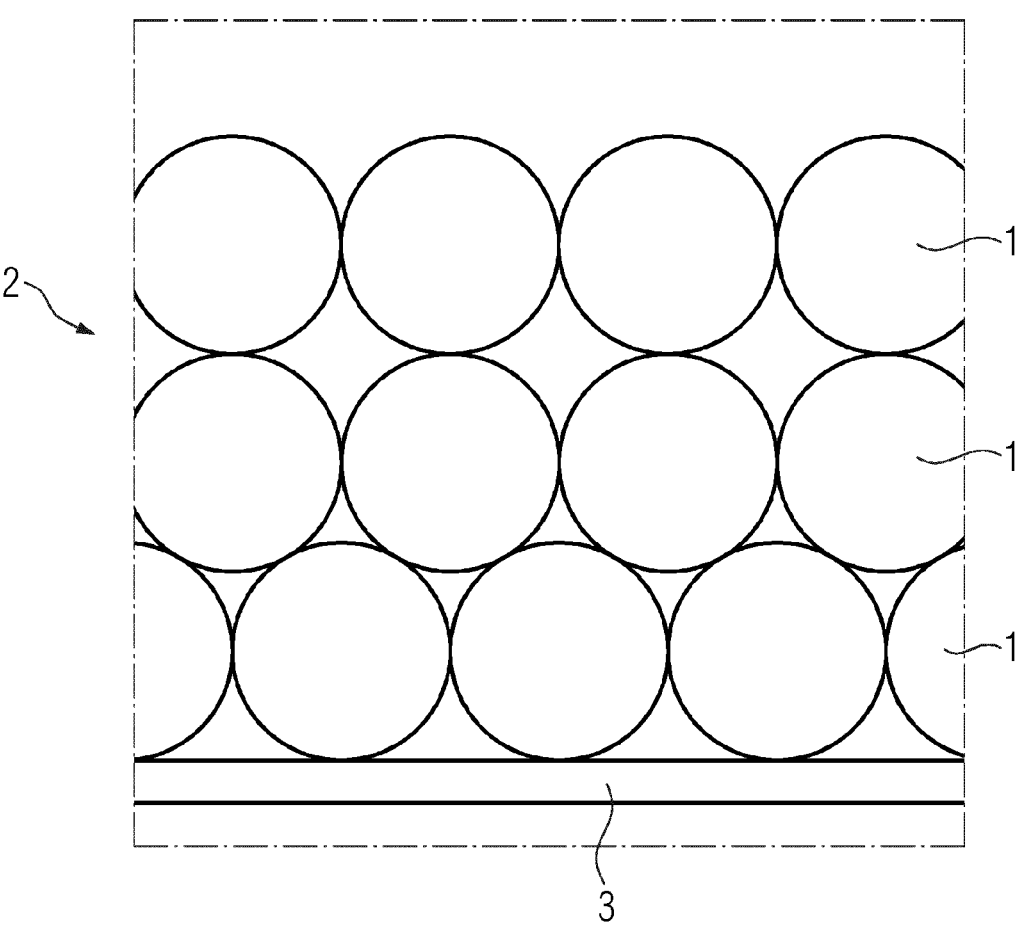
FIG. 1 shows a schematic cross-section through a theoretical powder layer of the inventive powder material.

According to one aspect, the present invention refers to a supported product as specified above.

Additive manufacturing methods are well established despite being relatively new. Especially additive manufacturing methods like 3D printing became topic for industrial applications in the past years and show a big potential to complement or replace existing conventional methods of manufacturing. The additive manufacturing methods are characterized by that a material is applied without some limiting element like some casting mold to build up the product. Examples of especially useful additive manufacturing methods are selective laser melting, electron beam melting and binder jetting. Such methods like, for example, binder jetting build up a product utilizing a powder material containing a binder, wherein the binder typically is removed in a later step to provide the final product. Very useful for the current application are 3D printing additive manufacturing methods like selective laser melting and electron beam melting building up the product from a powder bed, wherein the powder is melted layer by layer. By repeating this melting process for each layer of the product the 3-dimensional product is provided.

It was noted that typical embodiments utilize a powder material containing a particle size providing a $D_{50}$ selected from a specific range. According to further embodiments it is preferred that the $D_{50}$ is selected from the range from 14 μm to 53 μm, more preferred from 16 μm to 51 μm, even more preferred from 24 μm to 45 μm. It was noted that the benefits with regard to the processability of the powder is increased for such particle sizes.

For typical applications like 3D printing processes it was noted that the powder material can be beneficially selected from a certain range. According to further embodiments it is preferred that at least 80 wt.-%, more preferred at least 90 wt.-%, even more preferred at least 95 wt.-%, of the powder material provides a particle size selected from the range from 12 μm to 55 μm, more preferred from 15 μm to 50 μm, even more preferred from 18 μm to 46 μm. For example, this allows to utilize existing powder material feeding devices including recoaters used to provide a homogeneously distributed powder layer.

Additionally, it was noted that it is typically beneficial to define an upper limit of the particle size. According to further embodiments it is preferred that the powder material provides a particle size of at most 60 μm, more preferred at most 57 μm, even more preferred at most 52 μm. Although, the inventive effects are also observed for bigger particles it was noted that the effect is weaker compared to smaller particles. Surprisingly, it was noted that such absolute upper limit of the particle sizes is beneficially combined with the ranges of the particle sizes as specified above. Although, this absolute limit is near the upper limit of the ranges specifying only certain amount of the particles the overall benefit significantly improves when removing the possibility that single very large particles may be included.

To provide products for highly advanced technical fields like the field of continuous flow engines like gas turbines or steam turbines, especially gas turbines, a number of additive manufacturing methods have been well established in the art. Examples are selective laser melting (SLM) or electron beam melting (EBM). Herein, the aforementioned manufacturing methods are especially beneficially utilized to provide metallic components of such technical fields. According to further embodiments it is preferred that the powder material consists of at least 90 wt.-%, more preferred at least 95 wt.-%, even more preferred at least 98 wt.-%, of a metal or a metal alloy. Typically, it is preferred that such metal or metal alloy provides a high temperature resistance. Such metals or metal alloys allow to utilize the inventive powder materials, for example, for the hot path components of continuous flow engines. For example, such metal or metal alloy can be selected from titanium and nickel superalloys. Especially useful materials in this context are nickel superalloys. Corresponding manufacturing methods utilizing such powder material allow to easily realize complex components specifically optimized to provide improved characteristics. For example, the possibility to provide a highly specific and reliable cooling channel layout inside a component of a continuous flow engine is very beneficial. Surprisingly, it was noted that a significant benefit can already be obtained for additive manufacturing processes already utilized in industrial processes. A further significant improvement is expected for optimized processes and conditions not yet implemented on an industrial scale. Nonmetallic components contained in the powder material can be, for example, nonmetallic coatings of the particles or binder as utilized for binder jetting.

A further material to be beneficially utilized according to the present invention is a mixture of a ceramic material and a binder material. According to further embodiments it is preferred that the powder material consists of at least 90 wt.-%, more preferred at least 95 weight %, even more preferred at least 98 wt.-%, of a combination of a ceramic material and binder. It was noted that such material provides an improved applicability. To provide the inventive powder material it can be necessary in this context to bind the binder material to the surface of the ceramic material as the binder material tends to provide a wider size distribution possible resulting in a segregation depending on the handling. Surprisingly, it was noted that adapting corresponding powder materials accordingly improves the feeding process and processability as well as stability and reliability of the resulting structure to fulfill the predefined geometric requirements. Additional components being no ceramic material or binder can be, for example, metal particle or polymeric materials. For example, it can also be preferred to include materials optimizing the flow properties of the powder material.

According to further embodiments it is preferred that the powder material consists of at least 80 wt.-%, more preferred at least 90 wt.-%, even more preferred at least 95 wt.-%, of a ceramic material. For specific applications like heat shields as utilized in continuous flow engines like gas turbines, the inventive powder material essentially consisting of ceramic materials provides a significantly improved processability compared to ceramic powder materials not fulfilling the requirements of the invention. Especially, the possibility to avoid additional post processing steps that might result in cracks of some ceramic product is highly beneficial. Additional components besides the ceramic material can be, for example, a binder or a component as mentioned above.

Furthermore, it was noted that establishing the predefined connection of the upper limit and lower limit excluding finest particles can furthermore be utilized to provide an improved effect. According to further embodiments it is preferred that the powder material provides a $D_{100}$, a $D_{10}$ and a difference D, wherein the difference $D=D_{100}-D_{10}$, wherein D is at most 21% of the $D_{100}$, more preferred at most 17% of the $D_{100}$, even more preferred at most 14%, of the $D_{100}$. Surprisingly, it was noted that including such further requirement increases the effect of the powder material while some complex step to remove the finest particles can be neglected. Removing just finest particles on the other hand was surprisingly less beneficial than expected. Thus, such distribution can easily be realized reducing the cost of providing such powder material while improving its effect.

For certain applications like, for example, selective laser melting or electron beam melting utilizing a powder bed to be melted layer-wise it is typically beneficial to decrease the overall deviation from the mean size. According to further embodiments it is preferred that powder material provides a particle size distribution L being at most 1.9, more preferred at most 1.5, even more preferred at most 1.2, wherein L is calculated according to formula (I)

$$L=(D_{90}-D_{10})/D_{50} \tag{I}$$

Furthermore, it was noted that for typical embodiments like utilizing nickel superalloys it was even preferred to further narrow down the particle size distribution factor L. According to further embodiments it is preferred that the particle sizes distribution factor L is at most 0.8, more preferred at most 0.5, even more preferred at most 0.4. It was noted that corresponding powder materials, for example, provide an improved processability utilizing conventional recoaters.

However, it was further noted that for certain embodiments it was less beneficial to decrease such overall deviation from the mean size below a certain degree. According to further embodiments it is preferred that the powder material provides a particle size distribution factor L being at least 0.08, more preferred at least 0.12, even more preferred at least 0.14, wherein L is calculated according to formula (I)

$$L=(D_{90}-D_{10})/D_{50} \tag{I}$$

Surprisingly, it was noted that the improvements obtained in relation to the effort required to provide such powder material renders certain powder materials less attractive for utilization.

According to further embodiments it is preferred that the powder material provides a particle size distribution factor L being selected from the range from 0.08 to 1.9, more preferred from the range from 0.12 to 1.2, even more preferred from the range from 0.14 to 0.8, wherein L is calculated according to formula (I)

$$L=(D_{90}-D_{10})/D_{50} \tag{I}$$

For generic powder materials it is typically beneficial to provide an upper limit of bigger particles taking into account the mean size of these particles. According to further embodiments it is preferred that at most 5 wt.-%, more preferred at most 3 wt.-%, even more preferred at most 2 wt.-%, of the particles provide a particle size being at least 20% higher than the $D_{50}$ based on the value of the $D_{50}$. According to specific embodiments it is even preferred that the particle size of the aforementioned upper limit of the particles is at least 17%, more preferred at least 15%, from the $D_{50}$. While it was noted that the transport process inside a powder feeding device can surprisingly be positively influenced by an increased amount of bigger particles such relatively decreased amount of bigger particles is surprisingly beneficial for additive manufacturing processes like those manufacturing structures out of a powder bed by layer-wise melting powder bed layers. For certain embodiments to guarantee highest precision for such additive manufacturing methods it can even be preferred to reduce the amount of such particles to less than 0.5 wt.-% or even 0 wt.-%.

While the technical teaching as disclosed herein can be applied to a broad variety of particles it was noted that it is especially pronounced for spherical particles. According to further embodiments it is preferred that at least 95 wt.-%, even more preferred at least 98 wt.-%, of the particles are essentially spherical. The term "essential spherical" as used herein refers to a shape of the particles, wherein the particles provide a surface, a center point and a surface distance, wherein the surface distance represents the distance from the center point to the surface, wherein the particle provides a biggest surface distance and a smallest surface distance, wherein the center point is selected to provide the smallest difference between the biggest surface distance and the smallest surface distance, wherein the particle provides a distance from the center point to each point of the surface being less than 10%, more preferred less than 5%, even more preferred less than 3%, differing from the average value of the surface distance, wherein the average value of the surface distance is the mean value of the highest and lowest surface distance.

According to a further aspect the present invention refers to a method of additive manufacturing, preferably 3D-printing, containing the step of manufacturing a product or repairing a product utilizing an inventive powder material.

Furthermore, it was noted that certain additive manufacturing methods benefit more strongly from the inventive powder materials. According to further embodiments it is preferred that the additive manufacturing method utilizes a powder bed of the powder material, wherein the method contains the step of selective melting a part of the powder bed to manufacture or repair the product. Examples of additive manufacturing methods that above average benefit from utilizing the inventive powder material are selective laser melting and electron beam melting.

According to a further aspect the present invention refers to a use of an inventive powder material for additive manufacturing, more preferred 3D-printing.

Typically, the inventive powder material is especially beneficially utilized to manufacture or repair a product. According to further embodiments it is preferred that a product is manufactured or repaired, more preferred manufactured.

According to a further aspect the present invention refers to a product manufactured from an inventive powder material or according to an inventive method or repaired utilizing an inventive powder material or repaired according to an inventive method.

For example, the inventive powder material can be beneficially utilized to provide a green body to be fused together in a further process step. According to further embodiments it is preferred that the product consists of a multitude of particles held together by a binder. This allows to provide a solid component with flexible geometry by applying a sintering process on said product. Surprisingly, it was noted that despite effects like sintering shrinkage resulting in a minor change of the form during such post processing step it became possible utilizing the inventive powder material to provide a high accuracy of the shape. In this context, it appears that more reliable predictions of, for example, the sintering shrinkage are possible.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

FIG. 1 shows a schematic cross-section through a theoretical powder layer 2 of an inventive powder material. The powder layer 2 is located on a surface 3 utilized as base to support the product to be manufactured. Alternatively, the surface 3 could be a part of the product to be repaired. In such case the damaged part is, for example, cut off or grinded. The additive manufacturing process is utilized to build up a comparable or an improved version of the removed part.

The powder material consisting of a metal alloy provides a very homogeneous size of the particles 1, wherein the particles 1 shown provide essentially the same size and a spherical shape. Based on the small deviations of the particle size it is possible to provide a very structured layer of the particles with very little spaces between them.

As it can be seen in the figure that topmost layer is slightly displaced resulting in bigger spaces between the middle and the topmost layer. Surprisingly, it was observed that such regular and predictable spaces appearing can be far more easily compensated in case possible cavities might result therefrom. Based on sensors or other indicators it is possible to detect such larger scale deviations. In such case, the operating conditions can be adapted to ensure the homogeneous structure of the resulting product.

Utilizing such powder material, for example, in an 3D printing process like selective laser melting or electron beam melting is especially beneficial. Herein, such layers of the powder material are applied onto a surface and selectively melted to create a 3D object.

Figure 2:
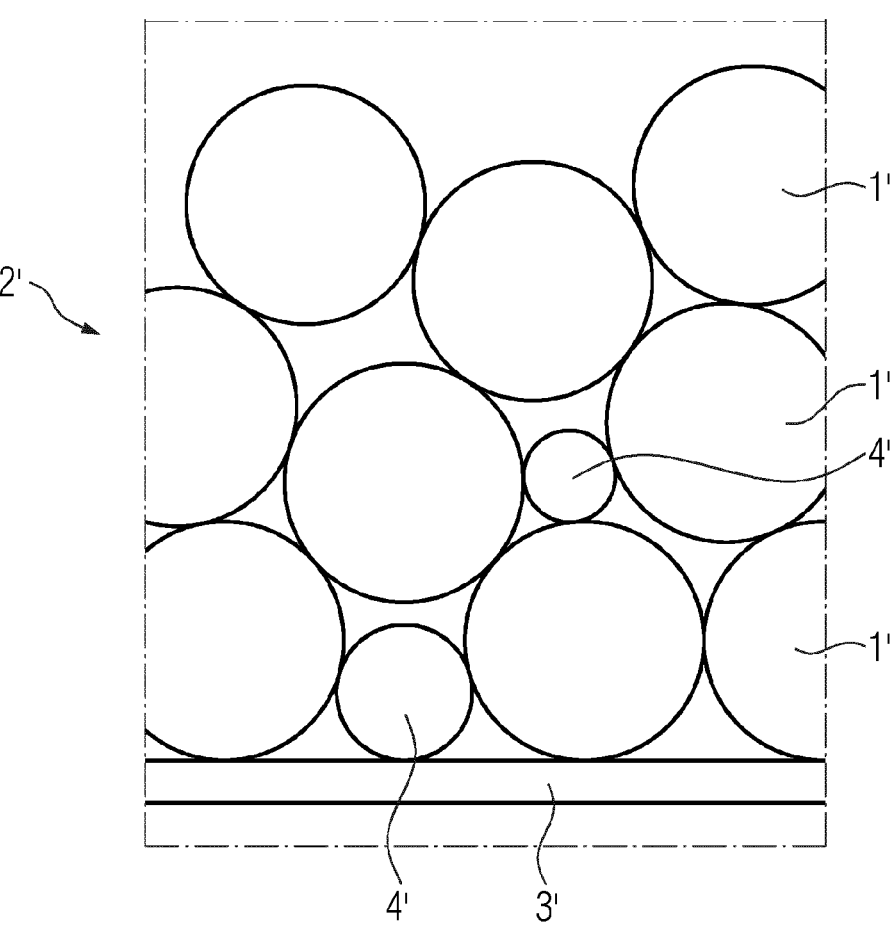
FIG. 2 shows a schematic cross-section through a theoretical powder layer of a conventional powder material depicting smaller particles included.

FIG. 2 shows a schematic cross-section through a theoretical powder layer 2' of a conventional powder material depicting smaller particles 4' included. Contrary to the powder material of FIG. 1 a greater number of smaller particles 4' influence the arrangement of the powder particles 1' in the depicted cross-section. The more chaotic arrangement of the particles results in bigger and smaller spaces between the particles possibly leading to cavities. Based on the unpredictable nature of such arrangement and the singular appearance of such cavities statistically distributed it is far more complicated to detect such deviations in highly optimized manufacturing processes and, for example, provide a counter action ensuring a homogeneous structure.

Figure 3:
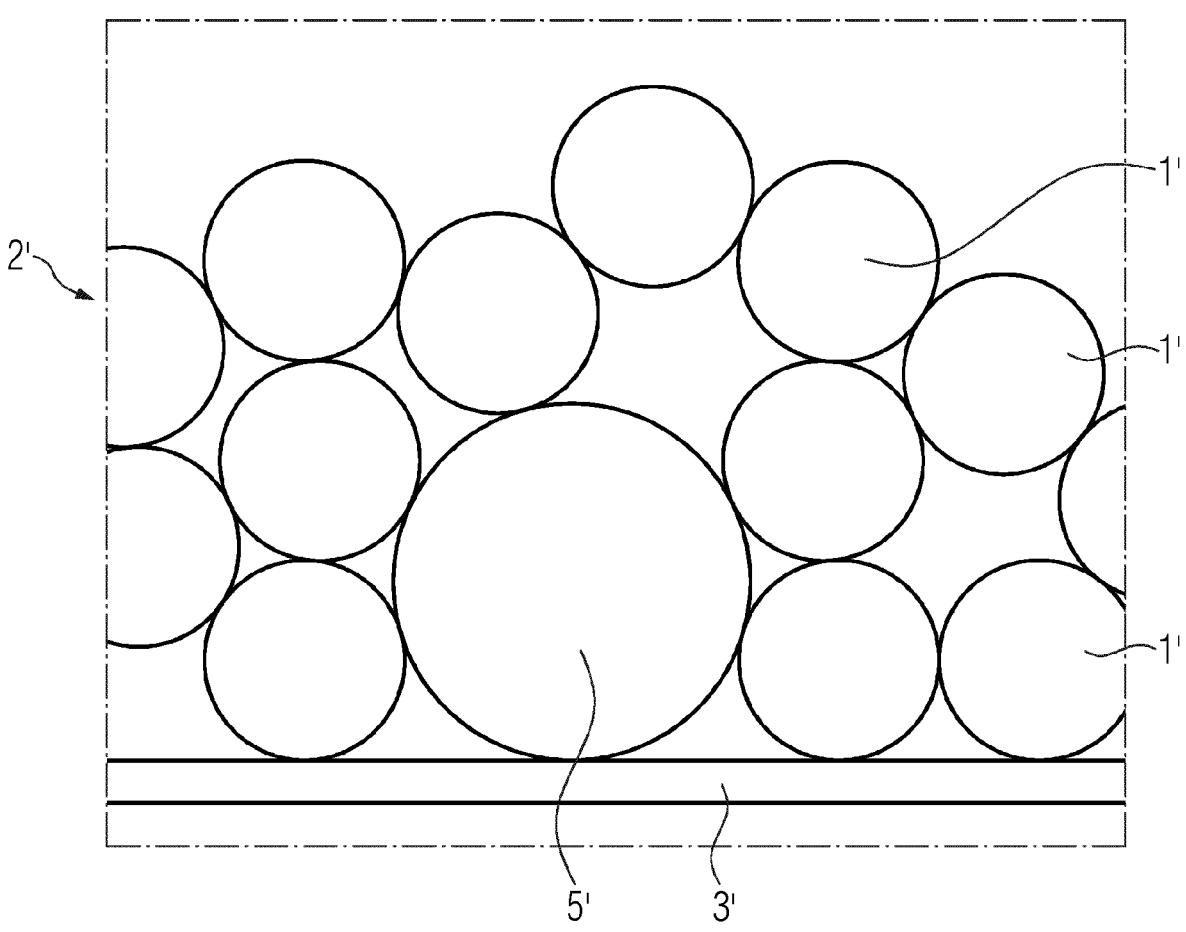
FIG. 3 shows a schematic cross-section through a theoretical powder layer of a conventional powder material depicting a bigger particle included.

FIG. 3 shows a schematic cross-section through a theoretical powder layer 2' of a conventional powder material depicting a bigger particle 5' included. It is assumed that a comparable effect to this depicted theoretical case is occurring in case of even a small number of significantly bigger particles 5'. Herein, the spherical particles 1' providing a very homogenous size are not able to provide a high density of the powder layer 2' at certain locations resulting in significant spaces between them. This can result in bigger cavities included in the product reducing its quality or even rendering it unusable. The bigger spaces compared to the smaller particles as shown in FIG. 2 should indicate the observation that a smaller number of big particles apparently disturb the structure of the powder layer 2' more than a comparable amount of smaller particles.

While the theoretical figures as shown in FIGS. 1 to 3 are simplifying the real subject matter to provide an easy understandable explanation it has been noted that the effect seems to be greater than just to be expected from such explanation. It is assumed that additional effects are present currently not identified resulting in the complete improvement observed for the embodiments as described in the description.

The present invention was only described in further detail for explanatory purposes. However, the invention is not to be understood being limited to these embodiments as they represent embodiments providing additional benefits to solve specific problems or fulfilling specific needs. The scope of the protection should be understood to be only limited by the claims attached.

The invention claimed is:

1. A powder material for additive manufacturing, comprising:
   particles, wherein the particles comprise a metal, a metal alloy, or a ceramic material;
   wherein the powder material provides a $D_{50}$ particle size comprising a value representing a particle size wherein 50 wt.-% of the particles are equal to or smaller, based on volume average particle size distribution;
   wherein the $D_{50}$ particle size is from 14 μm to 53 μm;
   wherein at most 25 wt.-% of the particles provide a particle size differing more than 20% from the $D_{50}$ particle size based on the value of the $D_{50}$ particle size,
   wherein the powder material provides a $D_{100}$ particle size as the largest particle size of the particles, a $D_{10}$ particle size as a particle size that 10 wt.-% of the particles are equal to or smaller, and a difference D,
   wherein the difference $D=D_{100}-D_{10}$,
   wherein D is at most 21% of the $D_{100}$.

2. The powder material according to claim 1,
   wherein at most 5 wt.-% of the particles provide a particle size being at least 20% higher than the $D_{50}$ particle size based on the value of the $D_{50}$ particle size.

3. The powder material according to claim 1,
   wherein the powder material provides a particle size distribution factor L being at least 0.08 and being at most 1.2,
   wherein L is calculated according to formula (I)

$$L=(D_{90}-D_{10})/D_{50} \tag{I},$$

wherein $D_{90}$ is a particle size that 90 wt.-% of the particles are equal to or smaller, and wherein $D_{10}$ is a particle size that 10 wt.-% of the particles are equal to or smaller.

4. The powder material according to claim 1,
   wherein the $D_{50}$ particle size is from 16 μm to 51 μm, or wherein at least 80 wt.-% of the powder material provides a particle size selected from 12 μm to 55 μm.

5. The powder material according to claim 1,
   wherein the powder material consists of at least 90 wt.-% of a metal or a metal alloy.

6. The powder material according to claim 1,
   wherein the powder material provides a particle size of at most 60 μm.

7. The powder material according to claim 1,
   wherein the powder material consists of at least 80 wt.-% of a ceramic material.

8. The powder material according to claim 1, wherein the powder material provides a particle size distribution factor L being at most 1.9, wherein L is calculated according to formula (I)

$$L=(D_{90}-D_{10})/D_{50} \tag{I},$$

wherein $D_{50}$ is a particle size that 90 wt.-% of the particles are equal to or smaller, and wherein $D_{10}$ is a particle size that 10 wt.-% of the particles are equal to or smaller.

9. A method of additive manufacturing, comprising:

manufacturing a product from the powder material or repairing a product utilizing the powder material according to claim 1.

10. The method of additive manufacturing according to claim 9, wherein the additive manufacturing method utilizes a powder bed of the powder material, wherein the method includes selective melting a part of the powder bed to manufacture or repair the product.

11. The method of additive manufacturing according to claim 9, comprising manufacturing or repairing the product via a selective laser melting additive manufacturing process or an electron beam melting additive manufacturing process.

12. A method of additive manufacturing, comprising:

using the powder material according to claim 1 for additive manufacturing.

13. A product manufactured from the powder material according to claim 1.

14. The product according to claim 13, wherein the product consists of a multitude of the particles held together by a binder.

15. A product manufactured or repaired according to the method of claim 9.

\* \* \* \* \*